UNITED STATES PATENT OFFICE.

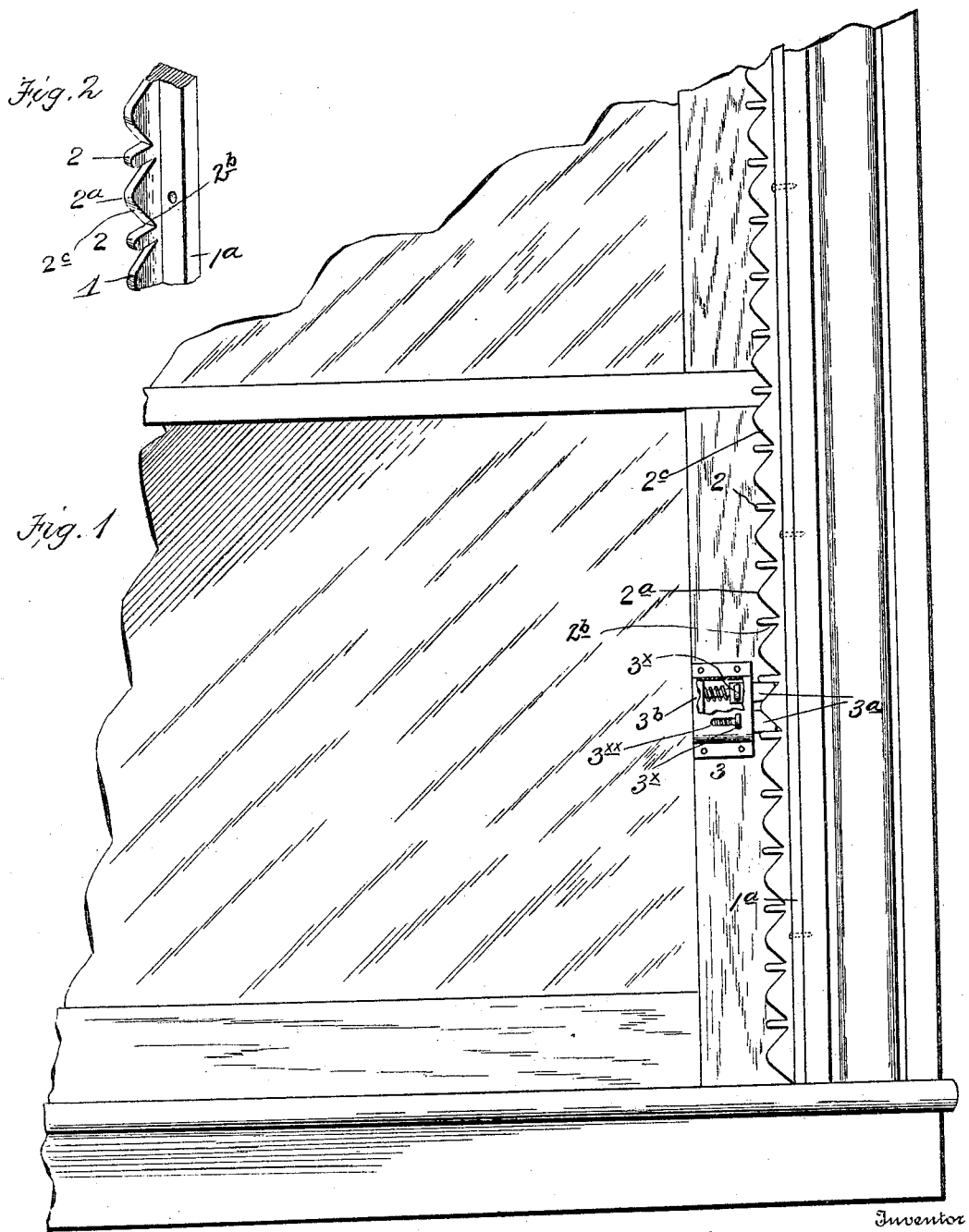

ARTIE MARTIN, OF HARMONY, INDIANA, ASSIGNOR OF ONE-HALF TO JAMES C. BELL, OF HARMONY, INDIANA.

SASH-FASTENER.

No. 798,520. Specification of Letters Patent. Patented Aug. 29, 1905.

Application filed April 7, 1905. Serial No. 254,355.

*To all whom it may concern:*

Be it known that I, ARTIE MARTIN, a citizen of the United States, residing at Harmony, in the county of Clay and State of Indiana, have invented new and useful Improvements in Window-Fasteners, of which the following is a specification.

My invention relates to improvements in what may be termed "sash-holders."

It has for its object primarily to effect the ready adjustment and retention of the sash, more especially the lower one, at the required point of elevation and to provide for carrying out these ends in an effective, simple, and economic manner; and with these objects in view the invention consists of certain structural features, substantially as hereinafter fully disclosed, and particularly pointed out by the claims.

In the accompanying drawing, illustrating the preferred embodiment of my invention, I provide a rack 1, preferably right-angled in cross-section, with one member or arm of the angle forming a flange $1^a$, presented and providing for the fastening thereof to the window facing or framing, as shown, without requiring to be let into or countersunk in the latter. This enables the applying and securing of the rack to the window-frame with facility readily and quickly in addition to avoiding the necessity of cutting or mortising the frame, as required in sinking the base or a portion of the rack into the latter, the advantages of my invention over which being apparent. Said rack formed by the other arm of the angle comprises a continuous arrangement of teeth 2, with intermediary elevations $2^a$ therebetween, formed edgewise thereon. Said teeth 2 have horizontal right-lined effective surfaces or portions $2^b$, with their extreme outer ends or edges beveled just enough to permit the ready passage or escape past the same of the bolts of the holder, presently described, as the sash is raised or lowered by hand. Said elevations $2^a$ are each formed with a double incline, with the apex thereof central of the elevation, while said inclines themselves combine with the teeth 2 to form acute-angled notches $2^c$ to receive and into which are thrust the bolts of the sash-holder to render effective their holding action.

Suitably secured upon the face of the lower sash by fastenings, as screws passing through flanges of its casing and entering said sash, is a sash-holder 3, comprising principally duplicate horizontal bevel-ended bolts $3^a$, adapted to engage the rack 1. Said bolts are cushioned or seated, preferably, upon helical or coiled springs $3^b$, suitably housed within the bolt-casing to hold said bolts automatically projected and in engagement with the rack 1. The duplicate spring-bolts $3^a$ have the beveled surfaces of their effective ends presented toward each other and the right-lined upper and lower edges of their projected portions presented upward and downward, respectively, to accordingly engage the corresponding surfaces or edges of any two successive teeth of the rack 1. Said bolts are manipulated by thumb or finger pieces or knobs $3^x$, projecting therefrom through longitudinal slots $3^{xx}$ in the bolt-casing, as shown. By this arrangement it will be noted that the sash is locked in position at whatever point it may be adjusted as against movement either up or down. Consequently when in its wholly closed or lowered position said bolts will serve to effectively lock the sash as against being raised or opened from the outside. Also it is observed that there is no possibility of a slipping action of the bolts, since the points of contact or engagement therebetween and the rack-teeth are positive and direct, being in right lines to each other.

I claim—

1. A sash-holder, comprising a rack having a continuous arrangement of right-lined teeth with intermediate double-inclined elevations having their bases terminating at the inner portions of said teeth and their apices equidistant from the outer ends of said teeth, and means adapted for engagement with said teeth and elevations from the window-sash.

2. A sash-holder comprising a rack having a continuous arrangement of right-lined teeth, with intermediate double-inclined elevations, having their bases terminating at the inner ends of said teeth and their apices equidistant from the outer ends of said teeth, and duplicate automatically-projected bolts with their right-lined surfaces or edges adapted to engage the corresponding surfaces of any two of said teeth.

In testimony whereof I affix my signature in presence of two subscribing witnesses.

ARTIE MARTIN.

Witnesses:
FRED C. BRITTON,
JOHN W. WATSON.